US009285484B2

(12) United States Patent  (10) Patent No.: US 9,285,484 B2
Shima  (45) Date of Patent: Mar. 15, 2016

(54) METHOD AND APPARATUS FOR DETERMINING A POSITION OF A DEVICE RELATIVE TO A VIRTUAL FENCE

(71) Applicant: QUALCOMM Incorporated, San Diego, CA (US)

(72) Inventor: James M. Shima, Boulder, CA (US)

(73) Assignee: QUALCOMM Incorporated, San Diego, CA (US)

( * ) Notice: Subject to any disclaimer, the term of this patent is extended or adjusted under 35 U.S.C. 154(b) by 295 days.

(21) Appl. No.: 13/665,156

(22) Filed: Oct. 31, 2012

(65) Prior Publication Data

US 2014/0120943 A1 May 1, 2014

(51) Int. Cl.
| | |
|---|---|
| *G08B 1/08* | (2006.01) |
| *G01S 19/49* | (2010.01) |
| *A01K 15/02* | (2006.01) |
| *G01S 19/14* | (2010.01) |
| *G01S 19/46* | (2010.01) |
| *G01S 19/48* | (2010.01) |

(52) U.S. Cl.
CPC ............... *G01S 19/49* (2013.01); *A01K 15/023* (2013.01); *G01S 19/14* (2013.01); *G01S 19/46* (2013.01); *G01S 19/48* (2013.01)

(58) Field of Classification Search
CPC ......... G01S 19/48; G01S 19/46; G01S 19/49; G01S 19/14; A01K 15/023
USPC ................ 340/539.1, 539.13, 572.1, 988
See application file for complete search history.

(56) References Cited

U.S. PATENT DOCUMENTS

| | | | |
|---|---|---|---|
| 5,868,100 A | 2/1999 | Marsh | |
| 5,892,454 A | 4/1999 | Schipper et al. | |
| 6,342,847 B1 | 1/2002 | Archuleta et al. | |
| 6,581,546 B1 | 6/2003 | Dalland et al. | |
| 8,031,067 B2 | 10/2011 | Greenberg | |
| 8,115,642 B2 | 2/2012 | Thompson et al. | |
| 8,838,481 B2 * | 9/2014 | Moshfeghi | 705/16 |
| 2004/0108939 A1 | 6/2004 | Giunta | |
| 2005/0000468 A1 | 1/2005 | Giunta | |
| 2006/0197672 A1 | 9/2006 | Talamas et al. | |
| 2010/0127919 A1 * | 5/2010 | Curran et al. | 342/357.07 |
| 2012/0000431 A1 | 1/2012 | Khoshkish | |

OTHER PUBLICATIONS

International Search Report and Written Opinion—PCT/US2013/067566—ISA/EPO—Dec. 13, 2013.
Havahart, "How Havahart® Wireless Dog Fences Work", Havahart Wireless, Apr. 16, 2012, 8pgs.

\* cited by examiner

*Primary Examiner* — Daryl Pope
(74) *Attorney, Agent, or Firm* — Muncy, Geissler, Olds & Lowe, P.C.

(57) ABSTRACT

The disclosure relates to determining a position of a mobile device relative to a perimeter of a virtual fence. An embodiment receives coordinates representing the perimeter of the virtual fence, determines a proximate location of the mobile device using a hybrid combination of a satellite-based proximate location and an auxiliary local station-based proximate location, and provides feedback based on a comparison of the proximate location of the mobile device to the coordinates representing the perimeter of the virtual fence.

39 Claims, 4 Drawing Sheets

METHOD AND APPARATUS FOR DETERMINING A POSITION OF A DEVICE RELATIVE TO A VIRTUAL FENCE

FIELD OF DISCLOSURE

This disclosure relates to a method, apparatus, and system for using SPS and RF signals to determine the position of a device, and specifically relates to determining the position of a device relative to the perimeter of a virtual fence.

BACKGROUND

There are many types of fences that can be used to keep various entities such as pets, livestock, equipment, and even people within certain locations or perimeters. The most common are physical barriers. There are also underground fences, which use buried wire as the fence perimeter. Various types of mechanisms or methods may be used to prevent these entities from going outside certain locations or perimeters. For example, a collar-worn device is used to train animals not to pass over the underground wire. Failure to comply gives the animals a negative feedback stimulus, such as an electrical shock. One problem with these fences, however, is that once the animal or other entities cross the fence perimeter, it will no longer receive the negative stimulus. As such, an animal can roam freely after the initial stimuli. Also, underground fences may require a complete circuit around a property and does not allow for complex designs for keeping pets out of, for example, a garden or pool area within the property. Also, the cost of installing such an underground system is high and once installed it is not easily modified.

Pet location and tracking solutions using satellite positioning systems (SPS), such as global positioning system (GPS), is a growing field. These technologies, however, do not allow complex three-dimensional (3D) mapping of an area to confine animals to a desired space. Further, conventional techniques do not compensate for SPS outages or unavailability, indoor tracking, and the like.

SUMMARY

The disclosure relates to determining a position of a mobile device relative to a perimeter of a virtual fence. An embodiment receives coordinates representing the perimeter of the virtual fence, determines a proximate location of the mobile device using a hybrid combination of a satellite-based proximate location and an auxiliary local station-based proximate location, and provides feedback based on a comparison of the proximate location of the mobile device to the coordinates representing the perimeter of the virtual fence.

BRIEF DESCRIPTION OF THE DRAWINGS

The accompanying drawings are presented to aid in the description of the various embodiments and are provided solely for illustration of the embodiments and not limitation thereof.

DETAILED DESCRIPTION

Figure 1A:
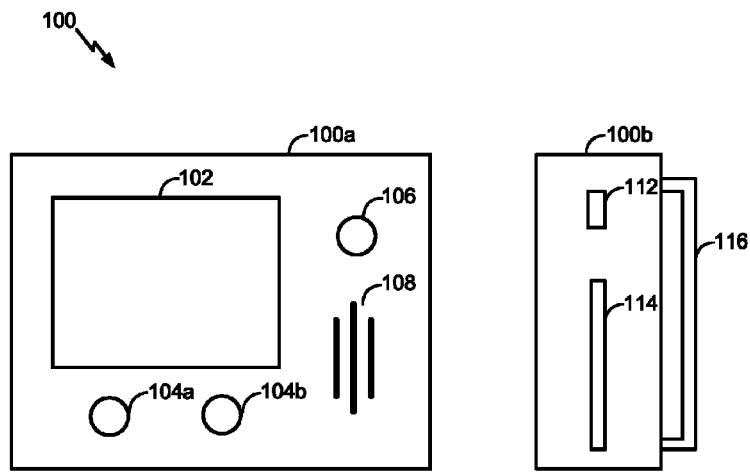
FIGS. 1A & 1B illustrates a simplified apparatus according to one or more embodiments.

Aspects of the various embodiments are disclosed in the following description and related drawings directed to specific embodiments are illustrated. Alternate embodiments may be devised without departing from the scope of the invention. Additionally, well-known elements of the various embodiments will not be described in detail or will be omitted so as not to obscure the relevant details of the various embodiments.

The word "exemplary" is used herein to mean "serving as an example, instance, or illustration." Any embodiment described herein as "exemplary" is not necessarily to be construed as preferred or advantageous over other embodiments. Likewise, the term "embodiments" or "embodiments of the invention" does not require that all embodiments include the discussed feature, advantage or mode of operation.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the various embodiments may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Embodiments described herein enable users to design complex virtual fences for their pets, people, livestock, equipment, or any other moving or moveable body or objects they wish to keep and/or track within a given geographical boundary. A master station, such as a personal computer, an Internet website, a mobile device, etc., presents a user interface (UI) on which the user can design the virtual fence. The user constructs the virtual fence by drawing on a representation of the area in which the virtual fence is to be placed, manually entering coordinates or distances, setting waypoints, etc. Since the virtual fence can be constructed by drawing on a screen, it does not have to have a simple perimeter. Rather, different types of virtual fences can be designed to produce complex three-dimensional (3D) virtual fence maps. Such maps may include indoor and outdoor areas, upstairs and downstairs areas (e.g., altitude mapping, altitude limits, etc.), wooded and clear areas, areas with substantially different elevations, etc. They can also include arbitrarily drawn "keep out" areas within the virtual fence perimeter and dynamic gates along the perimeter. The virtual fence perimeter may also change dynamically based on certain criteria or at the user's command.

The virtually fenced body, such as a pet, wears a small apparatus, e.g. mounted to its collar, which stores the coordinates of one or more virtual fences and determines the position of the wearer. The apparatus may contain satellite positioning system (SPS) and/or radio frequency (RF) receivers. The SPS receiver is used for rough positioning of the collar device using Earth-centered, Earth-fixed (ECEF) coordinates to determine the apparatus' position compared to the stored virtual fence coordinates. Under heavy canopy or indoor use, where SPS is spotty or unavailable, the apparatus can switch to a hybrid of SPS and RF positioning, RF triangulation only, dead reckoning, and/or real-time kinematic (RTK) techniques to provide continuous positioning. The apparatus can compare the accuracy of the received SPS signals to a threshold, and if the accuracy is less than the threshold, switch to one or more of the other positioning techniques. Accordingly, a proximate location of the apparatus can be obtained via a hybrid combination of satellites and local stations, wherein the local stations provide an auxiliary proximate location.

In an embodiment, if the virtual fence perimeter is breached by the wearer, it may continue to receive a negative feedback stimulus until it returns inside the perimeter. Unlike an underground wired system, this encourages the pet to return to the virtually fenced-in area.

These and other aspects of the various embodiments will be described in more detail with respect to the following figures.

FIG. 1A illustrates a simplified apparatus 100 according to various embodiments. Apparatus 100 should be small enough to be conveniently attached to the wearer without concern for the wearer regarding the weight, shape, or size of the apparatus. The front 100a of apparatus 100 may include a visual display 102 (such as a liquid crystal display (LCD)), programming/power buttons 104a and 104b, a light-emitting diode (LED) 106, and/or a speaker 108. Visual display 102 may be used to navigate various functions of apparatus 100. LED 106 may provide a visual indication of various statuses of apparatus 100, such as ON/OFF, battery status, etc. The side 100b of apparatus 100 may include a universal serial bus (USB) port 112 and an external memory card slot 114, such as for secure digital (SD) cards. USB port 112 may be used to charge a rechargeable battery housed within the body of apparatus 100. External memory card slot 114 may be used to receive an SD card loaded with virtual fence coordinates and/or other data, such as user options, dynamic gate criteria, etc. Speaker 108 may be used to provide audible warnings and/or feedback to the wearer and/or user. The apparatus 100 may also include two electrical nodes (not shown) for delivering an electrical shock to the wearer and/or a microphone (not shown) for detecting external noises. In an embodiment, the apparatus 100 may also include a camera (not shown) for capturing still pictures and/or video of the wearer's environment.

The apparatus 100 may also include a connector 116 for attaching apparatus 100 to a wearer. For example, a pet collar, a bracelet, a belt, a strap, a shoestring, etc. may pass through the connector 116, securing apparatus 100 to the body of the wearer.

In an embodiment, visual display 102 may be a touch screen display, in which case there would be no need for multiple programming buttons 104a and 104b. Rather, only a power button would be needed. In another embodiment, apparatus 100 may be connected to a computer, such as the master station, via a USB cable connected to USB port 112, and programmed through the computer's user interface. As such, there would be no need for visual display 102 or programming buttons 104a and 104b other than a power button.

The wireless communication between the apparatus 100 and the master station can be based on different technologies, such as code division multiple access (CDMA), wideband CDMA (W-CDMA), time division multiple access (TDMA), frequency division multiple access (FDMA), orthogonal frequency division multiplexing (OFDM), the global system for mobile communications (GSM), 3GPP Long Term Evolution (LTE), or other protocols that may be used in a wireless communications network or a data communications network. Accordingly, the illustrations provided herein are not intended to limit the various embodiments and are merely to aid in the description of aspects of the embodiments.

Using an external memory card may allow for virtual fence perimeters to be quickly transferred from one apparatus 100 to another. In an embodiment, however, apparatus 100 may include sufficient internal storage for storing virtual fence information such that there would be no need for an external memory card. In an embodiment, apparatus 100 may receive virtual fence information via an internal or external antenna (not shown) capable of receiving wireless signals, such as cellular signals, wireless local area network (WLAN) signals (such as Wi-Fi), radio-frequency identification (RFID) signals, and the like.

Figure 1B:
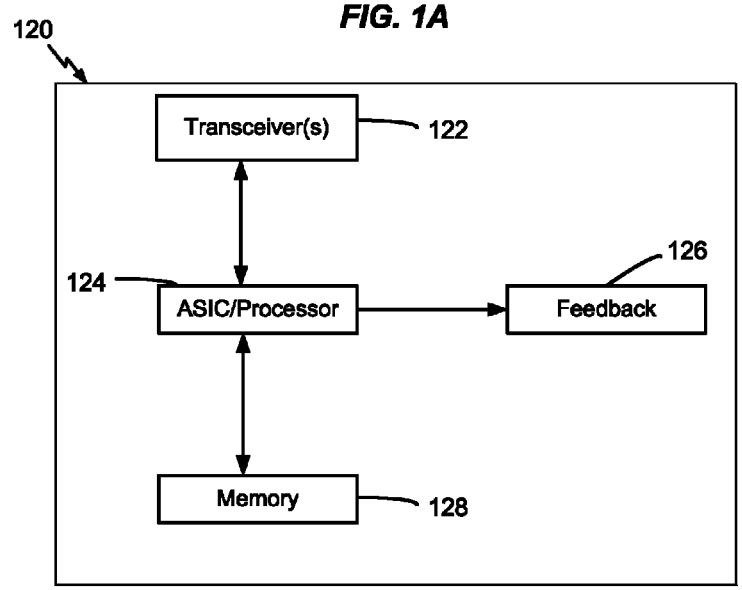

FIG. 1B illustrates an embodiment of an apparatus 120. The apparatus 120 can include an application specific integrated circuit (ASIC) 124, or other processor, microprocessor, logic circuit, or other data processing device, which is coupled to one or more transceivers 122 and memory 124. In one embodiment, the transceiver(s) 122 can receive coordinates representing the perimeter(s) of a virtual fence and send it to the ASIC/Processor 124. For example, the transceiver(s) can receive the coordinates via Wi-Fi, RFID, LTE, CDMA, WCDMA, GSM, etc. In another embodiment, the memory 128 can have the coordinates loaded on it. For example, the memory can be a removable media, which would allow a user to set the coordinates on the removable media on a different device and then plug it into the apparatus for use. The removable media may include but is not limited to an optical disk, SD card, or memory stick. In another embodiment, the memory 128 can be internal memory, which can be programmed with the coordinates via a display interface 102 or USB port 112. The memory 128 can be comprised of read-only memory (ROM), random-access memory (RAM), electrically erasable programmable ROM (EEPROM), flash cards, SD Card or any memory common to computer platforms.

In one embodiment, the ASIC/Processor 124 determines a proximate location of the mobile device using a hybrid combination of a satellite-based proximate location and an auxiliary local station-based proximate station. For example, the ASIC/Processor 124 can receive location information and/or position information from one or more transceivers 122. For example, the transceiver 122 can receive location information from base stations, femto cells, pico cells, RFID, etc. Additionally, it can receive positioning information from satellite based systems (SPS) such as GPS and GLONASS. Each transceiver 122 can also receive RF signals that can be used in positioning from local stations. For example, a transceiver 122 can receive RF signals from Wi-Fi, femto cells, pico cells, RFID, etc.

In one embodiment, based on a comparison of the proximate location of the mobile device to the coordinates representing the perimeter of the virtual fence, the ASIC/Processor 124 can provide feedback. For example, if the ASIC/Processor 124 is outside the virtual fence, the ASIC/Processor 124 can trigger feedback 126, which may include sending a notification to another device, sending feedback to another device, providing feedback to the wearer of the apparatus 120. The feedback may include, but is not limited, to sending the wearer a shock, playing a warning sound, playing an encouraging sound, sending a notification to a third party, sending notification to the wearer of the device, etc. The apparatus 120 can receive and execute software applications, data, and/or commands transmitted over a wireless network, USB cable, SD card, etc. The apparatus 120 can also be operably coupled to external devices, such as display 102, buttons 104a and 104b, and LED 106, among other components, as is known in the art.

Accordingly, an embodiment can include an apparatus with the ability to perform the functions described herein. As will be appreciated by those skilled in the art, the various logic elements can be embodied in discrete elements, software modules executed on a processor, or any combination of software and hardware to achieve the functionality disclosed herein. For example, ASIC 124, memory 128, and transceiver(s) 122 may all be used cooperatively to load, store, and execute the various functions disclosed herein and thus the logic to perform these functions may be distributed over various elements. Alternatively, the functionality could be incorporated into one discrete component. Therefore, the features of the apparatus 100 in FIG. 1A and 120 in FIG. 1B are to be considered merely illustrative and the invention is not limited to the illustrated features or arrangement.

Figure 2:
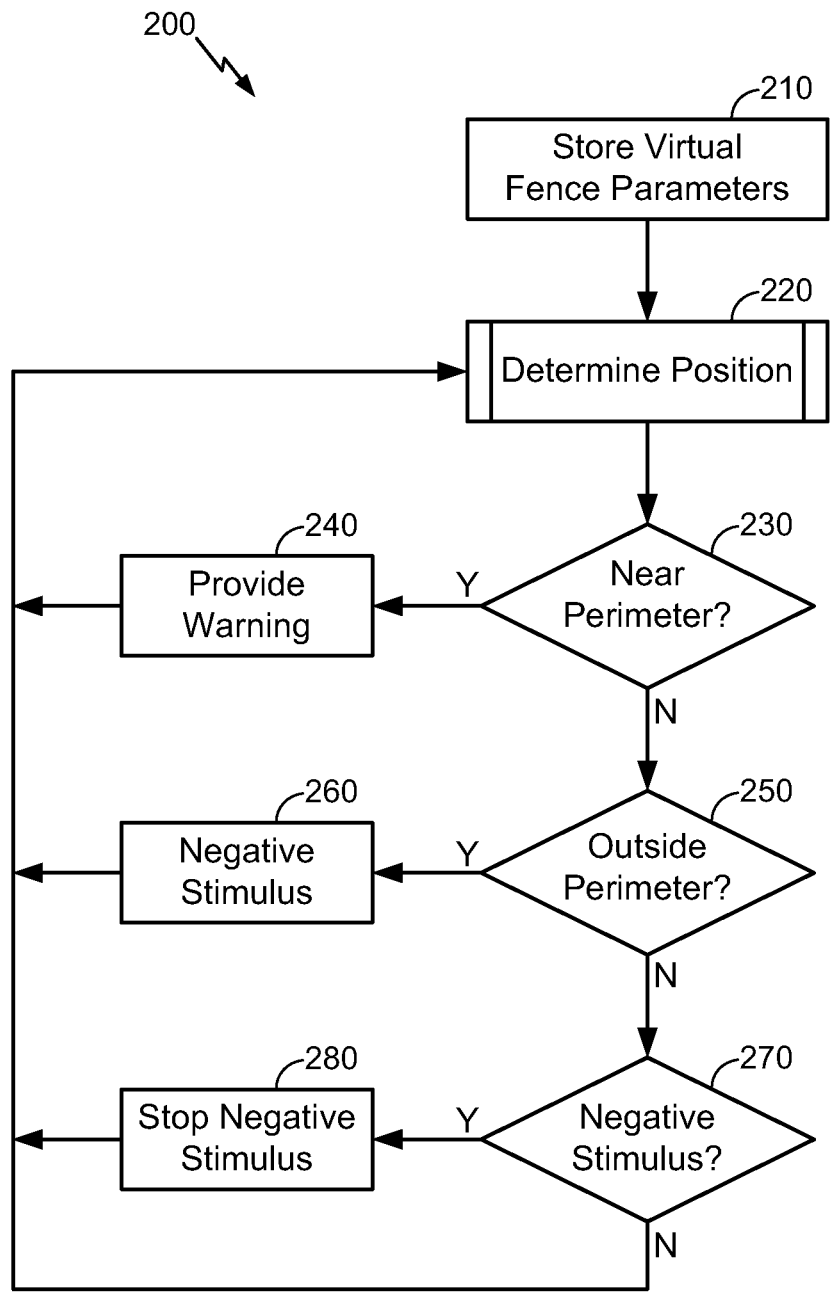
FIG. 2 illustrates a flowchart according to one or more embodiments.

FIG. 2 illustrates a flowchart 200 according to at least one embodiment. At 210, apparatus 100 receives and stores virtual fence information, such as coordinates for one or more virtual fence perimeters, user options, dynamic gate criteria, etc. As disclosed above, apparatus 100 may receive this data via a wired or wireless connection or via an external storage card.

A virtual fence may have a perimeter of any size, shape, and/or height and include any number of exclusion zones within the outermost perimeter. A virtual fence perimeter may enclose an indoor or outdoor area, or both. For example, a virtual fence for a pet may include the user's back yard and tiled kitchen, but exclude the user's pool area, front yard, and carpeted remainder of the house. An entirely indoor virtual fence may exclude the pet from the kitchen on the first floor and the user's office on the second floor, but allow it to move freely anywhere else in the house. Where apparatus 100 is attached to equipment kept in an office building, for example, the virtual fence may include certain floors and/or areas of the building and exclude all other floors and areas, thereby preventing someone from taking the equipment out of the secure area. Unlike conventional techniques, the various embodiments allow the user to define a 3D virtual fence perimeter, enabling the user to block off certain rooms on certain floors of a building.

The user defines a virtual fence by drawing the perimeter(s) on a visual representation of the area to be fenced. The master station may present this visual representation. For example, the user may be presented with an aerial/satellite map of the user's property and draw the virtual fence on that map. In another example, the user may draw the virtual fence on a 3D floor plan of the user's home. In another example, where the user is presented with a two-dimensional (2D) floor plan of the user's home, the user may draw the virtual fence for each floor and enter the distance between floors. The master station will then convert the 2D maps and inputted elevations to a 3D virtual fence perimeter. In another example, where a floor plan of the user's home is not available but SPS coordinates are, such as in an aerial view of the user's property, the user may enter measurements from a known point and/or line, such as the entrance and/or exterior walls of the user's home, to define the indoor virtual fence. The measurements may include a distance and compass direction from the known point or a distance and orientation, such as parallel, vertical, 90 degrees, etc., relative to the known line.

In an embodiment, the virtual fence perimeter need not be connected the entire way around. Rather, it can use existing barriers to augment the perimeter. For example, the virtual fence perimeter may include an open-ended section abutting a physical element in or adjacent to the area protected. In another example, the virtual fence perimeter may be a single barrier, such as across the bottom of a set of stairs or across a doorway. In yet another example, the virtual fence perimeter may open to an existing fenced corral.

Conventionally, virtual fence perimeters are drawn on a 2D aerial view of the area to be fenced. While the user may use 2D floor plans to define a 3D virtual fence, it is apparent that this is not the same as a 2D aerial view of the virtual fence because multiple floors of the same building are within the same virtual fence. As such, the virtual fence cannot be represented or operated in two dimensions because the perimeters of the different floors would overlap.

Apparatus 100 may store multiple virtual fences. For example, a user may setup one virtual fence for a pet for the user's home, a second virtual fence for the dog park, and a third virtual fence for when the user takes the pet to a relative's house.

In one embodiment, an RFID transmitter containing the coordinates of a virtual fence perimeter could be placed near the entrance to the virtual fence so that passing the device by the RFID transmitter would load the virtual fence coordinates onto the device (e.g., via an internal RFID receiver) and activate the virtual fence. A separate RFID transmitter could deactivate the virtual fence and instruct the device to delete the virtual fence information. For example, when a user arrives at a dog park, he or she can walk the dog (or carry the device) close enough to the RFID transmitter to activate it and download the coordinates to the device. Doing so may automatically load that particular virtual fence, or the user may have to select that virtual fence using the device interface. A separate RFID transmitter could deactivate and/or remove that particular virtual fence when the user leaves the dog park with the dog. Alternatively, the user could deactivate and/or remove the virtual fence using the device interface.

Further, a plurality of apparatuses may be used for a plurality of wearers within the same virtual fence(s). For example, a plurality of wearers within a single virtual fence may be livestock within a pasture, the user's pets and/or children on the user's property, or deaf and/or blind children on school property (e.g., to keep them away from hazardous areas such as roads, parking lots, etc.). Each wearer may have a different device identifier (ID). The device ID could be a Walsh code in a wideband code division multiple access (W-CDMA) system, MAC address, or any other unique code.

When traveling between virtual fences, it is not desirable to continue providing a negative stimulus to the wearer until the wearer is within the next virtual fence perimeter. To prevent this, the user may turn off apparatus 100 or disable the virtual fence at the master station or apparatus 100. In an embodiment, where it is not desirable to disable the entire virtual fence when moving the wearer from one virtual fence to another, such as when herding livestock, the user may define a dynamic gate in the perimeter of the virtual fence. This gate may be opened at apparatus 100 or at the master station. It may be opened by the user, at a scheduled time, or based on some criteria. The dynamic gate may open into another virtual fence or simply prevent apparatus 100 from enforcing the virtual fence when the wearer passes through the dynamic gate. This way, the wearer can be moved from one virtual fence to another without triggering the negative stimulus.

In the livestock example, the user may have multiple pastures in which the livestock graze, and wish to move the livestock from one to another every week. By using a dynamic gate, the user can herd the livestock through the gate without disabling the entire virtual fence and running the risk of livestock escaping.

A dynamic gate may also be defined to separate certain sections of the virtual fence from other sections. For example, a dynamic gate may permit entrance to a barn or feed stalls at certain times. In another example, where a virtual fence includes the first and second floor of the user's home, the user may define a dynamic gate at the bottom of the stairs between the first and second floors (there could of course be two virtual fences, one for the first floor and one for the second floor, but in this example there is one virtual fence). Where the wearer is a pet, for example, the user may define the gate to stay closed during the day, open at night for an hour to let the pet upstairs, and close again to keep it upstairs. Where the virtual fence includes an office building, there may be one gate at the elevator on one floor and another gate at the elevator on another floor. That way, a wearer can get on and off the elevator on authorized floors without having to define the elevator shaft between the floors as within the virtual fence perimeter. A wearer getting off the elevator on an unauthorized floor would trigger the negative stimulus of apparatus 100.

The perimeter of the virtual fence may change dynamically based on certain criteria. In an embodiment, a first virtual fence may shrink to herd the wearer(s) through a dynamic gate and into a second virtually-fenced area. The user may define the location and size of the dynamic gate, the time it should open, and/or the length of time it should remain open. Alternatively, the user may define the time period the gate should remain open by defining how quickly and/or in what increments the virtual fence should shrink. In another alternative, certain parameters may be determined automatically based on a history of the wearers' movements within the virtual fence, the number of wearers, and a judgment of the speed with which that number of wearers could move through the dynamic gate.

When the dynamic gate opens, the perimeter of the first virtual fence may begin to shrink, forcing the wearers towards and through the dynamic gate into the second virtually-fenced area. As the first virtual fence merges into the dynamic gate, the dynamic gate closes. The first virtual fence can be reestablished before opening the dynamic gate again to herd the wearers from the second or another virtually-fenced area back into the first virtually-fenced area.

In an embodiment, the perimeter of the virtual fence may change to force the wearer(s) to move from a first location to a second location. The user may define a virtual fence at the first location and select the second location to which the user wishes the virtual fence to move. The user may require the virtual fence to stay within a threshold of its original size. The user may also set the time at which the virtual fence should begin moving and/or the time it should take to move. The virtual fence will then automatically move from the first location to the second location according to the user-defined parameters, shifting the boundaries of the virtual fence as necessary to accommodate the terrain.

In an embodiment, the perimeter of the virtual fence may be conditional based on the parameters of the wearer. For example, a rancher may want to separate the adult cattle from the calves by using the altitude of the receivers to distinguish between the two and thus apply different fences. By establishing a height threshold and associating a particular fence perimeter for those that meet or exceed the height threshold, it allows the rancher to easily establish a perimeter and quickly associate a large group of animals to the fence rather than going through the time consuming process of associating a particular animal to a particular fence.

In an embodiment, the perimeter of the virtual fence may be conditional based on external events. For example, a virtual fence may be established to prevent a guide dog for the blind from walking across the street until the walking chirp sound goes off as a way to further protect the human user from danger. In this case, the device would listen for the sound and then remove that particular virtual fence. In another example, rather than setting a perimeter around every car, the device may be able to detect a car, based on sensors, WiFi (such as 802.11p), and place a perimeter around the car.

In an embodiment, the virtual fence may create a pathway based on a voice command. For example, a person may find a dog on the street and the person can issue a command such as 'Home', which would trigger the device to create a virtual fence pathway for the dog to get home.

In an embodiment, the height of the virtual fence may be adjusted or offset from the ground via altitude coordinates. For example, an owner may want to mentally stimulate their dogs while they are away, so they could setup a complex virtual fence in which the dog may have to jump over the virtual fence, crawl under the virtual fence, walk through virtual tunnels, or other types of designs to receive their treats. In another example, an owner may want their dog to get in the car but not crawl underneath the car, so the owner can draw a complex 3D virtual fence around the bottom part of their car, but allow access so the dog can get into the backseat of the car.

In an embodiment, the perimeter of the virtual fence may change based on other criteria, such as the time of day, day of the week, number of wearers within the virtual fence, types of wearers within the virtual fence, etc. For example, the user may define a virtual fence to be a certain size during the day and another size at night. In another example, the user may define a virtual fence to be a certain square footage per wearer, such that adding wearers to the virtually-fenced area automatically increases its size. In another example, the virtual fence may include an exclusion zone of a user-defined minimum size around another wearer within the same or another virtual fence. As such, the exclusion zone moves about within the virtual fence perimeter with the other wearer. For example, the family dog may be kept a minimum distance away from a child but is otherwise free to move around within the virtual fence perimeter. These are merely examples of how the perimeter of the virtual fence may change dynamically, and embodiments of the invention are not limited to these examples.

Referring to FIG. 2, at 220, apparatus 100 determines its current location. This will be described in more detail with reference to FIG. 3. One of buttons 104a and 104b may act as a power button, and any time apparatus 100 is ON, it may try to determine its position. This position determination may be continuous or near continuous, as illustrated by the loops of features 220-240, 220-260, and 220-280.

At 230, apparatus 100 determines whether or not it is near a perimeter of a stored virtual fence. When the user first turns apparatus 100 on, the user may select one of the stored virtual fences in which the wearer is currently located. Alternatively, apparatus 100 may automatically determine in which virtual fence it is located.

If, at 230, apparatus 100 is within a threshold distance from a virtual fence perimeter, then at 240, it provides a warning to the wearer. The threshold distance from the perimeter may be user-defined and/or based on the speed and direction of the wearer. For example, the user may define a ten-foot threshold if the virtual fence encloses a pasture and the wearers are cattle. Or, if the wearer is a dog and the virtual fence is inside the user's home, the user may define a one-foot threshold. Where the threshold distance is based on the speed and direction of the wearer, the threshold will be larger for a wearer moving quickly towards the perimeter versus a wearer moving slowly towards the perimeter, or even moving quickly along the perimeter. In that way, the wearer will not move so quickly through the warning zone that it does not receive the warning in time to be deterred by it.

The warning may be audible, such as one or a series of beeps and/or voice commands, tactile, such as one or a series of vibrations, and/or sensory, such as one or a series of mild shocks. For example, if the wearer is a dog, a recording of the user saying "no" or "stop" may be played as the warning. The warning may also increase in intensity as the wearer approaches the virtual fence perimeter. For example, when the wearer first crosses the threshold distance from the perimeter, it may receive a mild warning, such as a beep or vibration. As it continues to approach the perimeter, however, the beeping and/or vibrating may increase in intensity, and the wearer may even begin to receive mild shocks.

If, at 230, apparatus 100 is not within a threshold distance from a virtual fence perimeter, then at 250, apparatus 100 determines whether it is outside the virtual fence perimeter. If it is, then at 260, it generates a negative stimulus. Like a warning, the negative stimulus may be audible, such as one or a series of beeps and/or voice commands, tactile, such as one or a series of vibrations, and/or sensory, such as one or a series of mild shocks. To encourage the wearer to return to inside the virtual fence perimeter, the negative stimulus should be continuous or near continuous and the intensity should be greater than a warning. Where the wearer is a machine, such as a secure piece of equipment, the negative stimulus may additionally or alternatively include the triggering of an alarm within the building or other remote location remote from apparatus 100.

The negative stimulus may also trigger a notification being sent to the user, such as a text message, a page, an email, an automated phone call, etc. The notification may include the apparatus ID, the ID of the wearer, the location along the perimeter of the breach, the time of the breach, and/or any other relevant and/or user-defined information.

If, at 250, apparatus 100 is not outside the virtual fence perimeter, then at 270, apparatus 100 determines if it is producing or causing a negative stimulus. This would be the case where the wearer has just crossed back into the virtual fence perimeter. If it is producing a negative stimulus, then at 280, apparatus 100 stops producing the negative stimulus. If the negative stimulus was a remote alarm, the alarm may be triggered to stop. Apparatus 100 may also trigger a notification being sent to the user indicating that the breach has ceased and including the location of the reentry, the time of the reentry, the apparatus ID, the wearer ID, and/or any other relevant and/or user-defined information. If, at 270, apparatus 100 is not producing a negative stimulus, the flow returns to 220.

SPS positioning is the primary means for determining an accurate outdoor position. However, it is not effective where there is not a clear view of the sky, such as indoors, in a "canyon" (whether urban or natural), under tree canopy, etc. Since a virtual fence may include such areas, apparatus 100 may need to use alternative positioning techniques, such as RF triangulation, RTK positioning, or dead reckoning, when the SPS position is insufficient or unavailable. Apparatus 100 chooses which positioning technique to use based on the signals received and the accuracy of the corresponding position determination, as well as the accuracy required to enforce the perimeter of the virtual fence. For example, when the wearer is outdoors with a clear view of the sky, apparatus 100 will likely use its SPS position. However, when the wearer goes indoors, apparatus 100 will likely switch to its RF position. For example, the apparatus may determine it is indoors or outdoors is based on an availability of the satellite-based signals.

Figure 3:
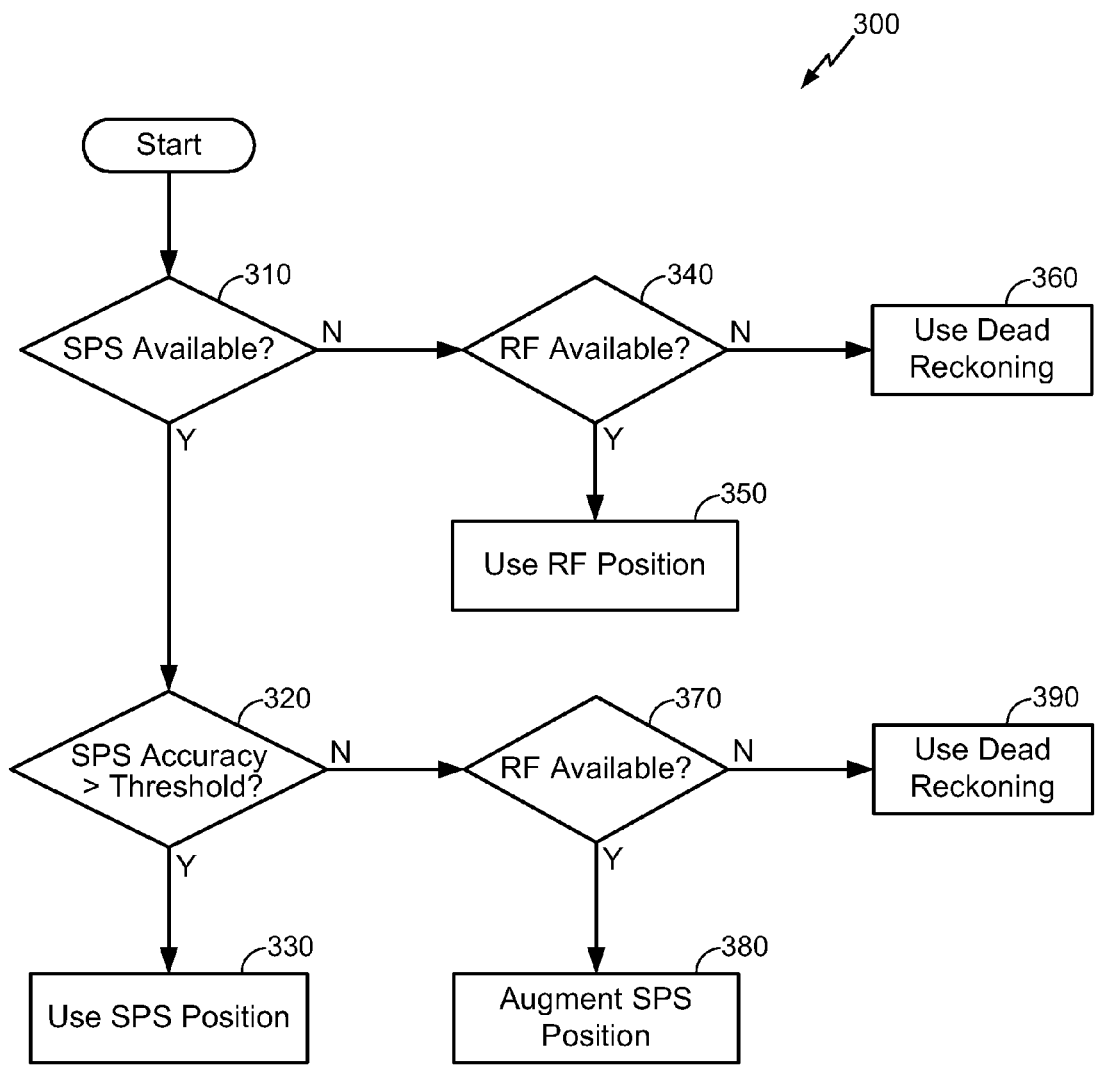
FIG. 3 illustrates a flowchart according to one or more embodiments.

FIG. 3 illustrates a flowchart 300 of at least one embodiment. Flowchart 300 may be performed at 220 of FIG. 2. At 310, apparatus 100 determines whether or not the received SPS signals, if any, are sufficient to establish a location fix. As disclosed above, they may not be where apparatus 100 does not have a clear view of the sky.

If, at 310, apparatus 100 cannot determine its SPS position, then at 340, apparatus 100 determines whether or not the received RF signals, if any, are sufficient to establish a location fix. RF signals may include signals from local terrestrial stations, such as, cellular base stations, RTK base stations, ultra-wideband access points, WiFi base stations, Femto cells, and/or Pico cells. Apparatus 100 may be configured to receive one or more types of RF signals such that apparatus 100 may determine its position, whether indoors or outdoors, from RF signals alone. Apparatus 100 may not be able to determine its RF position where there is a service outage of the RF signals apparatus 100 is configured to receive.

If, at 340, apparatus 100 cannot determine its RF position, then at 360, apparatus 100 may use dead reckoning to estimate its position based on its last known position, direction, speed, and/or historic patterns of movement. If a confidence in the accuracy of the dead reckoning position is above a threshold, apparatus 100 may use this position to determine whether or not it is near, outside, or inside a virtual fence perimeter, as disclosed with reference to FIG. 2. The confidence level may be based on the period of time since the last SPS or RF location fix, the speed of the wearer, the size of the virtual fence, and/or other factors. If the confidence is below the threshold, apparatus 100 may alert the user with a message, such as a text message, an email, or an automated phone call, informing the user of the lack of confidence in apparatus 100's location.

While dead reckoning may not be as accurate as SPS or RF positioning, it can be useful if, for example, the wearer has left the perimeter and/or the user is trying to find the wearer. It may also be useful where apparatus 100 loses its position due to a brief signal outage or loss.

If at 340, apparatus 100 can determine its RF position, then at 350, apparatus 100 uses the RF position to determine whether or not it is near, outside, or inside a virtual fence perimeter, as disclosed with reference to FIG. 2.

If, at 310, apparatus 100 can determine its SPS position, then at 320, apparatus 100 determines whether the accuracy of the SPS position is above a threshold. This threshold may be user defined and/or based on the size of the virtual fence. For example, a large outdoor virtual fence would not require the accuracy that an indoor fence would require. If the SPS accuracy is above the threshold, then at 330, apparatus 100 uses the SPS position to determine whether or not it is near, outside, or inside a virtual fence perimeter, as disclosed with reference to FIG. 2.

If the SPS accuracy is less than the threshold, however, then at 370, apparatus 100 determines whether or not its RF position is available, as disclosed above with reference to 340 of FIG. 3. If the RF position is not available, then at 390, apparatus 100 uses dead reckoning to estimate its position, as disclosed above with reference to 360 of FIG. 3. If the RF position is available, however, then at 380, apparatus 100 may augment or correct the SPS position with the RF position as is known in the art, or use the RF position alone, to determine whether or not it is near, outside, or inside a virtual fence perimeter, as disclosed with reference to FIG. 2.

Although FIG. 3 illustrates apparatus 100 determining its SPS and RF positions as discrete features, apparatus 100 may continuously calculate its position from the received SPS and RF signals and simply use one or the other or both according to the determinations made at 310, 320, 340, and 370.

Figure 4:
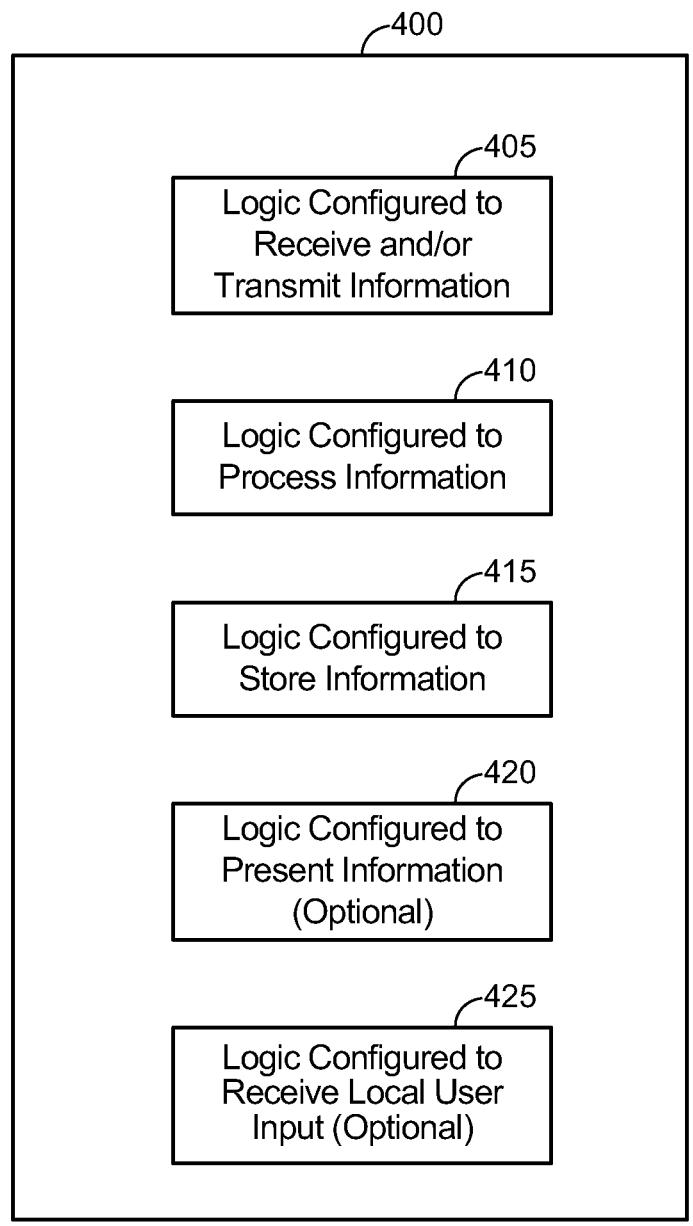
FIG. 4 illustrates an apparatus that includes logic configured to perform functionality according to one or more embodiments.

FIG. 4 illustrates an apparatus 400, such as apparatus 100 that includes logic configured to perform the functionality of the various embodiments disclosed here. Referring to FIG. 4, apparatus 400 includes logic configured to receive and/or transmit information 405. In an example, if apparatus 400 corresponds to a wireless communications device, the logic configured to receive and/or transmit information 405 can include a wireless communications interface (e.g., Bluetooth, WiFi, 2G, 3G, RFID, etc.) such as a wireless transceiver and associated hardware (e.g., an RF antenna, a MODEM, a modulator and/or demodulator, etc.). In another example, the logic configured to receive and/or transmit information 405 can correspond to a wired communications interface (e.g., a serial connection, a USB or Firewire connection, an Ethernet connection through which the Internet can be accessed, etc.). In a further example, the logic configured to receive and/or transmit information 405 can include sensory or measurement hardware by which apparatus 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, apparatus 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to apparatus 400 to perform measurement operations, converting information from one format to another, and so on. For example, the processor included in the logic configured to process information 410 can correspond to a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, apparatus 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, apparatus 400 further optionally includes logic configured to present information 420. In an example, the logic configured to display information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of apparatus 400. For example, if apparatus 400 corresponds to apparatus 100 as shown in FIG. 1, the logic configured to present information 420 can include the display 102. In a further example, the logic configured to present information 420 can be omitted for certain apparatuses, as described above. The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, apparatus 400 further optionally includes logic configured to receive local user input 425. In an example, the logic configured to receive local user input 425 can include at least a user input device and associated hardware. For example, the user input device can include buttons, a touch-screen display, a keyboard, a camera, an audio input device (e.g., a microphone or a port that can carry audio information such as a microphone jack, etc.), and/or any other device by which information can be received from a user or operator of apparatus 400. For example, if apparatus 400 corresponds to apparatus 100 as shown in FIG. 1, the logic configured to receive local user input 425 can include the display 102 (if implemented a touch-screen), programming buttons 104a and 104b, etc. The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 405. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

It will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment can include a computer readable media embodying a method for determining the position of an apparatus relative to the perimeter of a virtual fence. Accordingly, the various embodiments are not limited to illustrated examples and any means for performing the functionality described herein are included in embodiments of the invention.

While the foregoing disclosure shows illustrative embodiments, it should be noted that various changes and modifications could be made herein without departing from the scope of the invention as defined by the appended claims. The functions, steps and/or actions of the method claims in accordance with the various embodiments described herein need not be performed in any particular order. Furthermore, although elements of the embodiments may be described or claimed in the singular, the plural is contemplated unless limitation to the singular is explicitly stated.

What is claimed is:

1. A method for determining a position of a mobile device relative to a perimeter of a virtual fence, comprising:
    receiving coordinates representing the perimeter of the virtual fence;
    determining a proximate location of the mobile device using a hybrid combination of a satellite-based proximate location and an auxiliary local station-based proximate location, wherein determining the proximate location of the mobile device includes determining whether an accuracy of the satellite-based proximate location is greater than a threshold, and wherein the threshold is based on a size of the virtual fence; and
    providing feedback based on a comparison of the proximate location of the mobile device to the coordinates representing the perimeter of the virtual fence, wherein providing feedback includes providing feedback to a wearer of the mobile device to keep the wearer of the mobile device within the perimeter of the virtual fence.

2. The method of claim 1, where the determining the proximate location of the mobile device includes determining an altitude of the mobile device.

3. The method of claim 1, wherein the coordinates comprise three-dimensional (3D) coordinates.

4. The method of claim 1, wherein the perimeter of the virtual fence includes an indoor and an outdoor section.

5. The method of claim 1, wherein the perimeter of the virtual fence includes multiple floors of a building.

6. The method of claim 1, wherein the providing the feedback comprises providing feedback to the wearer within a threshold distance of the perimeter of the virtual fence.

7. The method of claim 6, wherein the threshold distance is based on a speed and direction of the mobile device.

8. The method of claim 6, further comprising:
    maintaining the feedback to the wearer until the perimeter of the virtual fence is reentered.

9. The method of claim 1, wherein the providing the feedback comprises providing the feedback to a user that is not wearing the mobile device.

10. The method of claim 9, wherein the feedback is a notification to the user that a wearer of the mobile device has breached the perimeter of the virtual fence.

11. The method of claim 9, wherein the feedback is a notification to the user that a wearer of the mobile device has re-entered the perimeter of the virtual fence.

12. The method of claim 1, wherein the perimeter of the virtual fence changes dynamically.

13. The method of claim 12, wherein the perimeter of the virtual fence is related to a second mobile device and is adjusted to ensure a minimum separation between the mobile device and the second mobile device.

14. The method of claim 12, wherein the perimeter of the virtual fence moves from a first location to a second location.

15. The method of claim 1, wherein the perimeter of the virtual fence includes a virtual gate.

16. The method of claim 15, wherein the perimeter of the virtual fence decreases in size until it merges with and closes the virtual gate.

17. The method of claim 1, wherein the determining the proximate location of the mobile device further comprises:
using the auxiliary local station-based proximate location based on the accuracy not being greater than the threshold, or a combination of the satellite-based proximate location and the auxiliary local station-based proximate location.

18. The method of claim 1, wherein the determining the proximate location of the mobile device comprises:
determining whether the satellite-based proximate location is available; and
using the auxiliary local station-based proximate location based on the satellite-based proximate location not being available.

19. The method of claim 1, wherein the determining the proximate location of the mobile device comprises:
determining whether the mobile device is located indoors or outdoors; and
using the auxiliary local station-based proximate location based on the mobile device being indoors.

20. The method of claim 19, wherein the determining whether the mobile device is located indoors or outdoors is based on an availability of the satellite-based proximate location.

21. The method of claim 1, wherein the local stations include cellular base stations, real-time kinematic (RTK) base stations, ultra-wideband access points, WiFi base stations, Femto cells, and/or Pico cells.

22. The method of claim 1, further comprising:
establishing a second perimeter of a second virtual fence;
determining a second proximate location of a second mobile device relative to the second perimeter; and
providing feedback to a second wearer of the second mobile device based on the second proximate location.

23. The method of claim 1, wherein the coordinates representing the perimeter of the virtual fence are conditionally based on one or more parameters.

24. The method of claim 23, wherein the one or more parameters include an altitude of the mobile device.

25. The method of claim 1, wherein the coordinates representing the perimeter of the virtual fence are conditionally based on one or more external events.

26. The method of claim 25, wherein the one or more external events include an audible command, an audible indication of safety, or an audible indication of danger.

27. An apparatus for determining a position of a mobile device relative to a perimeter of a virtual fence, comprising:
a module configured to receive coordinates representing the perimeter of the virtual fence;
a module configured to determine a proximate location of the mobile device using a hybrid combination of a satellite-based proximate location and an auxiliary local station-based proximate location, wherein the module configured to determine the proximate location of the mobile device is further configured to determine whether an accuracy of the satellite-based proximate location is greater than a threshold, and wherein the threshold is based on a size of the virtual fence; and
a module configured to provide feedback based on a comparison of the proximate location of the mobile device to the coordinates representing the perimeter of the virtual fence, wherein the module configured to provide feedback is further configured to provide feedback to a wearer of the mobile device to keep the wearer of the mobile device within the perimeter of the virtual fence.

28. The apparatus of claim 27, wherein the coordinates comprise three-dimensional (3D) coordinates.

29. The apparatus of claim 27, wherein the perimeter of the virtual fence includes an indoor section and an outdoor section.

30. An apparatus for determining a position of a mobile device relative to a perimeter of a virtual fence, comprising:
a processor;
a memory storing instructions that, when executed by the processor, cause the mobile device to:
receive coordinates representing the perimeter of the virtual fence;
determine a proximate location of the mobile device using a hybrid combination of a satellite-based proximate location and an auxiliary local station-based proximate location, wherein the instructions to determine the proximate location of the mobile device includes instructions to determine whether an accuracy of the satellite-based proximate location is greater than a threshold, and wherein the threshold is based on a size of the virtual fence; and
provide feedback based on a comparison of the proximate location of the mobile device to the coordinates representing the perimeter of the virtual fence, wherein the instructions to provide feedback includes instructions to provide feedback to a wearer of the mobile device to keep the wearer of the mobile device within the perimeter of the virtual fence.

31. The apparatus of claim 30, wherein the coordinates comprise three-dimensional (3D) coordinates.

32. The apparatus of claim 30, wherein the perimeter of the virtual fence includes an indoor section and an outdoor section.

33. An apparatus for determining a position of a mobile device relative to a perimeter of a virtual fence, comprising:
means for receiving coordinates representing the perimeter of the virtual fence;
means for determining a proximate location of the mobile device using a hybrid combination of a satellite-based proximate location and an auxiliary local station-based proximate location, wherein the means for determining the proximate location of the mobile device includes means for determining whether an accuracy of the satellite-based proximate location is greater than a threshold, and wherein the threshold is based on a size of the virtual fence; and
means for providing feedback based on a comparison of the proximate location of the mobile device to the coordinates representing the perimeter of the virtual fence, wherein the means for providing feedback includes means for providing feedback to a wearer of the mobile device to keep the wearer of the mobile device within the perimeter of the virtual fence.

34. The apparatus of claim 33, wherein the coordinates comprise three-dimensional (3D) coordinates.

35. The apparatus of claim 33, wherein the perimeter of the virtual fence includes an indoor section and an outdoor section.

36. A non-transitory computer-readable medium for determining a position of a mobile device relative to a perimeter of a virtual fence, comprising:
- at least one instruction to receive coordinates representing the perimeter of the virtual fence;
- at least one instruction to determine a proximate location of the mobile device using a hybrid combination of a satellite-based proximate location and an auxiliary local station-based proximate location, wherein the at least one instruction to determine the proximate location of the mobile device includes at least one instruction to determine whether an accuracy of the satellite-based proximate location is greater than a threshold, and wherein the threshold is based on a size of the virtual fence; and
- at least one instruction to provide feedback based on a comparison of the proximate location of the mobile device to the coordinates representing the perimeter of the virtual fence, wherein the at least one instruction to provide feedback includes at least one instruction to provide feedback to a wearer of the mobile device to keep the wearer of the mobile device within the perimeter of the virtual fence.

37. The apparatus of claim 36, wherein the coordinates comprise three-dimensional (3D) coordinates.

38. The apparatus of claim 36, wherein the perimeter of the virtual fence includes an indoor section and an outdoor section.

39. The method of claim 1, wherein providing feedback to the wearer of the mobile device to keep the wearer of the mobile device within the perimeter of the virtual fence includes providing at least one feedback to the wearer selected from the group consisting of: sending the wearer a shock, playing a warning sound, and playing an encouraging sound.

* * * * *